United States Patent Office

3,781,221
Patented Dec. 25, 1973

3,781,221
CATALYST COMPOSITIONS CONTAINING PLATINUM AND LEAD AND PROCESS FOR PREPARING THE SAME
Naoya Kominami, Tokyo, Toshiyuki Iwaisako, Oi, and Kusuo Ohki, Yamato, Japan, assignors to Asahi Kasei Kogyo Kabushiki Kaisha, Osaka, Japan
No Drawing. Filed Aug. 16, 1971, Ser. No. 172,197
Claims priority, application Japan, Aug. 18, 1970, 45/71,733
Int. Cl. B01j *11/12*
U.S. Cl. 252—432
15 Claims

ABSTRACT OF THE DISCLOSURE

Novel catalyst compositions are provided comprising an alumina carrier with pores of a pore diameter distribution having a peak in the range of 2,000–7,000 A. and an active agent containing platinum and lead supported on said alumina carrier. Such a catalyst composition can be prepared by a process comprising incorporating powdered alumina into specific organic substance, subjecting the resulting mixture to a molding, followed by firing to produce an alumina carrier having pores of the above-mentioned specific pore diameter distribution and making the active agent supported on the alumina carrier. The thus obtained catalyst is, due to its selective high activity, particularly useful in the reforming of hydrocarbons.

---

This invention relates to novel catalyst compositions and a process for the preparation of the same.

More particularly, this invention relates to a catalyst composition comprising an alumina carrier having pores of a pore diameter distribution with a peak in the range of 2,000–7,000 A. and an active agent containing platinum and lead supported on said alumina carrier. Also, it relates to a process for the preparation of the catalyst composition as defined above.

It has previously been found that the efficiency and selectivity of the reforming of hydrocarbons can be favourably improved by the presence of the two active components, i.e., platinum and lead, which was disclosed and claimed in our Japanese patent application No. 9,488/1969.

For the purpose of making the above-mentioned two active components exert their activity most effectively, we have made further studies on a combination of various catalyst carriers with such active components. As a result, it has been unexpectedly found that a specific type of alumina carrier is most appropriate for such a purpose which has pores of a pore diameter distribution having a peak in the range of 2,000–7,000 A.

More specifically, numerous studies on the surface area, crystal structure and the like, of carriers for a catalyst have been made in the art, but studies on the relationship between the pores of a catalyst and the catalytic activity and selectivity thereof have been so complicated that a general rule could not be established. Stated illustratively, the relationship is variable according to the type of reaction, the reaction condition, the active agent and the like. As a result of our extensive studies on the effect of pore size upon the activity of a platinum-lead catalyst, it has been found that a specific type of alumina carrier which has pores of a pore diameter distribution with a peak in the range of 2,000–7,000 A. can provide an excellent effect upon the above-mentioned catalyst system and this invention has been made on the basis of this finding.

It is, accordingly, an object of this invention to provide a catalyst composition which has a highly effective catalytic activity and is particularly useful for the reforming of hydrocarbons.

It is another object of the present invention to provide a process for the preparation of a catalyst composition of the character described, which is simple in operation and commercially useful.

Other objects and advantages of this invention will become apparent to those skilled in the art from the detailed description of this invention which follows.

According to the present invention, there is provided a catalyst composition comprising an alumina carrier having pores of a pore diameter distribution with a peak in the range of 2,000–7,000 A. and an active agent containing platinum and lead supported on said alumina carrier. Such a catalyst composition can be prepared by incorporating at least one organic substance into powdered alumina, said organic substance consisting of polysaccharides, starches, celluloses, cellulose derivatives, polyvinyl alcohol, polyethylene glycol, polypropylene glycol and polyacrylamide, subjecting the resulting mixture to molding, following by firing to produce an alumina carrier having pores of a pore diameter distribution with a peak in the range of 2,000–7,000 A. and then making an active agent containing platinum and lead supported on the alumina carrier. The term "celluloses" in this invention is used to include amorphous cellulose, microcrystalline cellulose and the mixtures thereof.

The "powdered alumina" which is employed in the process of this invention includes those powdered aluminas having a sufficient surface area to exert a function as a catalyst carrier, usually above 50 m.$^2$/g., for example $\gamma$-alumina, $\theta$-alumina, $\eta$-alumina, alumina hydroxides and hydrates, e.g., monohydrate and trihydrate, and the like. Especially is preferred $\gamma$-alumina. The powdered alumina may also contain less than 20% by weight of silica as a component.

As a preferred organic substance to be incorporated into the powdery alumina are mentioned those organic substances that could be eliminated during the firing step. The suitable organic substances include polysaccharides, starches, celluloses, cellulose derivatives, polyvinyl alcohol, polyethylene glycol, polypropylene glycol and polyacrylamide. The amount and method of addition may be optionally selected and determined depending upon a method of molding a carrier. But the organic substance may be usually employed in an amount of 1–10% by weight, preferably 2–5% by weight based on the weight of the powdery alumina.

After completion of the incorporation of the organic substance into the powdered alumina, the resulting mixture may be advantageously molded into any conventional shape. Any of the conventional molding methods may be suitably employed for such a purpose, which include, for example, a disc granulating method, an extrusion method, a tabletting method, a coprecipitation method and the like. Such a molding may be preferably effected with a suitable amount of water rather than under a dried condition. The organic substance, if soluble in water, may be incorporated in the form of an aqueous solution thereof. The amount of water to be present may be varied depending upon the molding method utilized, but about 50–75% by weight based on the powdered alumina is advantageous in such molding methods as granulating, extrusion and the like.

The illustrative explanation on the incorporation of such organic substance into the powdered alumina and the subsequent molding of the resulting mixture is now given. In case celluloses or starches which can be in the form of fine powders are employed as the organic substances, they are mixed directly with alumina powder and then, water is added, followed by a sufficient mixing by employing a suitable mixer such as a ball mill. In case polyvinyl alcohol or polyethylene glycol which is water-soluble is employed, it is in the form of an aqueous solution, added to alumina powder. In mixing, careful consideration should be given so that the powdered alumina will not form a large lump or mass. Especially when water is employed in mixing, the resulting mixture may preferably be subjected to an aging. The aging is conducted in such a manner that the mixture is allowed to stand at room temperature for about 24 hours. By such aging, water uniformly disperses and permeates in the mixture, so that a uniform and strong alumina carrier can be obtained by the subsequent molding and firing. The thus obtained mixture is then molded. When the disc granulating method is employed, the mixture of powdered alumina, organic substance and water is extruded by means of an extruder and then given a rotary movement on a rotating disc. As a result, by the action of a centrifugal force, gravity and the pressure produced between the disc and the extrudate, there is formed a spherical molding. The diameter of the spherical mold is determinde depending upon the factors including the number of revolutions and the amount of water employed. Therefore, such factors are suitably selected according to the sphere size desired. When the extrusion method is employed, the mixture is extruded by means of an extruder, and the extrudate is cut in an appropriate length and dried. When the tabletting method is employed, the mixture is tabletted by means of a tabletting machine or briquetting machine which is ordinarily utilized in the pharmaceutical industry. In the tabletting method, the molding operation can be effected with a lesser amount of water. In the coprecipitation method, an ordinary alumina sol is employed and an organic substance is added thereto, whereupon gelation or drying is effected. Industrially, such an operation can be effected by means of a spray granulating machine.

The active agent essentially comprises platinum and lead, but may further comprise a third active component, if desired, as will be mentioned later. The amount of platinum and lead, may be usually 0.01–2% by weight and 0.01–3% by weight and preferably 0.05–1% by weight and 0.05–1% by weight, respectively, of the finished catalyst.

The method for supporting the active agent on the alumina carrier may be any of those methods commonly employed in the art, for example, an impregnation method, a coprecipitation method (only for lead or the third component) and the like. The effective weight ratio of lead to platinum varies depending upon the preparation method utilized. For instance, the ratio of lead to platinum may be usually 0.1–3.0:1 in the impregnation method, 0.1–5.:1 in the coprecipitation method and 0.2–5.0:1 in another coprecipitation method wherein lead is first supported by coprecipitation and then platinum is supported by impregnation, and preferably 0.3–2.0:1, 0.3–3.0:1 and 0.3–3.0:1, respectively.

The firing to produce the alumina carrier may be advantageously effected at 300–900° C., preferably 400–700° C. for 1–20 hours. The firing is desirably effected in an oxidation atmosphere, preferably in air so that the organic substance incorporated in the alumina may be completely fired away.

The alumina carrier may, upon making the active agent supported thereon, be optionally fired. The firing on the alumina carrier supporting the active agent may be effected at a temperature of 400–700° C., preferably at a temperature of 450–600° C.

The process of this invention is also applicable to such a catalyst system wherein there is included at least one third active component in addition to the aforementioned two active components, i.e. lead and platinum. Illustrative examples of the third components include those elements as disclosed in our Japanese patent application Nos. 108,817/1969 and 40,914/1970, e.g., lithium, sodium, potassium, rubidium, cesium, copper, silver, gold, beryllium, magnesium, calcium, strontium, barium, zinc, cadmium, mercury, yttrium, boron, thallium, titanium, zirconium, germanium, tin, vanadium tantalium, phosphorus, antimony, bismuth, chromium, molybdenum, tungsten, manganese, rhenium, iron, cobalt, nickel, ruthenium, rhodium, palladium, osmium, iridium, thorium, uranium. The amount of the element to be supported may be varied depending upon the kind of the element, but the element may usually be employed in an amount of 0.01–3% by weight, preferably 0.05–1% by weight based on the weight of the finished catalyst.

The mechanism as to how the third component favorably acts on the Pt-Pb system is not yet understood. Yet, it is presumed that some interaction between the active component system, i.e., Pt-Pb/$Al_2O_3$ and the third component occurs to exert a favorable effect. One effect of the addition of the third component to the catalyst system is an increase in the effect of lead component in the catalyst system. It leads to (1) increase in catalytic activity; (2) increase in selectivity to aromatics (increase in concentration of aromatics in the product obtained by the reforming of hydrocarbons); (3) decrease in the rate of lowering the catalytic activity; (4) increase in yield of the liquid product; and the like (disclosed in Japanese patent application Nos. 67,617/1969, 103,817/1969, 11,095/1970 and 40,914/1970). Such effects of the third component applies to a catalytic compostion of the present invention.

One feature of the catalyst prepared according to the process of this invention resides in a specified distribution range of a pore diameter in the powdered alumina pore, which could not be expected, and this distribution is believed due to the incorporation of the specific organic substance and the subsequent firing.

Another feature of the catalyst prepared according to the process of this invention resides in its high activity in the reforming of hydrocarbons, in particular, its selective high activity in the conversion of fractions having a high boiling point, which would result in extremely less paraffin and naphthene hydrocarbons in fractions having a high boiling point of the product. This feature is significant for those manufacturers who are engaged in the production of aromatics since, for example, in the conversion of naphtha to aromatics, the concentration of aromatics in those fractions boiling at the same temperature as xylenes or a higher temperature is extremely high in the converted oil even if the space velocity is high and thus an extraction step can be omitted. The exact mechanism of the specific activity and selectivity of the catalyst prepared by the present process is not fully understood at this time.

The following examples are given only for the purpose of illustrating this invention. All percents are given by weight unless otherwise indicated. Examples 1 to 3 are intended to illustrate the manufacture of the catalyst carrier which may be employed in the preparation of catalysts of this invention.

EXAMPLE 1

To 1,200 g. of γ-alumina powder (passing 200-mesh sieve) were added 50 g. of microcrystalline cellulose powder and 800 ml. of distilled water and the resulting mixture was stirred for about 80 minutes. Then, the mixture was extruded through a screen of 1.5 mm. diameter and dried for 10 hours in a dryer at 120° C. The dried alumina was fired at 550° C. for 3 hours in the air. The alumina carrier thus obtained will be hereinafter referred to as carrier A.

The measurement of the pore diameters of the so obtained carrier by a mercury method showed the following distribution.

| Pore diameter (A.): | Volume ($10^{-2}$ ml./g.) |
|---|---|
| 1000 | 1.2 |
| 2000 | 2.8 |
| 3500 | 4.1 |
| 4500 | 1.5 |
| 8000 | 0.5 |

EXAMPLE 2

To 500 g. of γ-alumina powder were added 30 g. of cellulose powder and the resulting mixture was admixed for 10 hours by means of a ball mill. Then, 350 ml. of distilled water were added thereto and mixed for additional 15 minutes. The mixture thus obtained was extruded through a screen of 10 mm. diameter and the extrudate was made into granules having an average diameter of 2.5 mm. by means of a disc granulator machine at 200 r.p.m. The granules thus formed were fired at 600° C. for 5 hours in the air. They will be hereinafter referred to as carrier B.

The measurement of the pore diameters of the so obtained carrier by a mercury method showed the following distribution.

| Pore diameter (A.): | Volume ($10^{-2}$ ml./g.) |
|---|---|
| 2000 | 1.7 |
| 3000 | 2.3 |
| 4000 | 3.2 |
| 5000 | 4.4 |
| 6000 | 2.5 |
| 7000 | 1.3 |
| 8000 | 0.4 |

EXAMPLE 3

The same procedure as described in the above Example 2 was repeated except that the additives as indicated below were additionally employed. The following four kinds of carriers were prepared which will be hereinafter referred to as carriers $C_1$, $C_2$, $C_3$ and $C_4$, respectively.

The measurement of the pore diameters of these carriers by means of a mercury method showed the following distribution:

| | | Volume ($10^{-2}$ ml./g.) | | |
|---|---|---|---|---|
| Carrier | Additive | 2,000 (A.) | 4,000 (A.) | 7,000 (A.) |
| $C_1$ | Soluble starch | 0.5 | 0.8 | 0.6 |
| $C_2$ | Polyvinyl alcohol | 0.9 | 1.8 | 1.0 |
| $C_3$ | Polypropylene glycol | 0.5 | 1.2 | 0.3 |
| $C_4$ | Polyacrylamide | 1.2 | 1.9 | 0.7 |

EXAMPLE 4

Into an aqueous solution of each 0.02 mole/l. of chloroplatinic acid·hexahydrate ($H_2[PtCl_6]\cdot 6H_2O$) and lead nitrate ($Pb(NO_3)_2$) were dipped 100 ml. of the carrier A. After evaporation to dryness, the residue was fired for 5 hours in a furnace maintained at 570° C. to produce a catalyst having a composition of 0.50% Pt-0.21% PbAl/$_2O_3$.

The catalyst thus prepared was charged into a SUS 32 reactor having a diameter of 1.25 inches. Then, the reforming reaction was effected under the following conditions:

Hydrogen:heavy naphtha [1] =7.5:1 (volume ratio)
Liquid hourly space velocity (LHSV)=3.0
Reaction pressure=15 kg./cm.$^2$
Reaction temperature=500° C.

[1] The composition stock (vol. percent): Paraffin 63.4; olefin 0.1; naphthene 24.3; and aromatics 12.2.

The results of this reaction until 50 hours are shown below:

|   | Percent |
|---|---|
| Yield of aromatics (average) | 64.3 |
| Concentration of aromatics in fractions boiling at above 135° C. | 99.6 |

EXAMPLE 5

Into an aqueous solution of 0.02 mole/l., 0.02 mole/l. and 0.01 mole/l. of chloroplatinic acid, lead nitrate and uranyl nitrate·hexahydrate ($UO_2(NO_3)_2\cdot 6H_2O$), respectively, were dipped 100 ml. of the carrier B. Then, the resulting mixture was fired at 550° C. for 5 hours to produce a catalyst having a composition of 0.5% Pt-0.21% Pb-0.31% U/$Al_2O_3$.

The reforming reaction was effected in the same manner as in the above Example 4 by utilizing the catalyst thus prepared.

The results of this rection until 50 hours are shown below:

|   | Percent |
|---|---|
| Yield of aromatics (average) | 69.2 |
| Concentration of aromatics in fractions boiling at above 135° C. | 99.8 |

EXAMPLE 6

Into an aqueous solution of 0.02 mole/l., 0.02 mole/l. and 0.01 mole/l. of chloroplatinic acid, lead nitrate and cadmium nitrate·tetrahydrate ($Cd(NO_3)_2\cdot 4H_2O$), respectively, were dipped 100 ml. of the carrier B. Then the resulting mixture was fired at 570° C. for 5 hours to produce a catalyst having a composition of 0.5% pt-0.4% Pb-0.3% Cd/$Al_2O_3$. The reforming reaction was effected in the same manner as in the above Example 4 by utilizing the catalyst thus prepared.

The results of this reaction until 50 hours are shown below:

|   | Percent |
|---|---|
| Yield of aromatics (average) | 69.3 |
| Concentration of aromatics in fractions boiling at above 135° C. | 99.8 |

EXAMPLES 7-12

Into a mixture of an aqueous solution of each 0.02 mole/l. of lead chloride and the salt as indicated below and 200 ml. of distilled water were dipped 140 ml. of the carrier A. After evaporation to dryness, the residue was fired at 550° C. for 5 hours.. The thus obtained composition was dipped into a mixture of an aqueous solution of 0.02 mole/l. of $H_2[PtCl_6]\cdot 6H_2O$ and 200 ml. of distilled water. After evaporation to dryness, the residue was fired at 550° C. for 1 hour to produce a catalyst having a composition of 0.5% Pt-0.5% Pb-$x$% M (as identified below)/$Al_2O_3$.

Using the thus prepared catalyst, the reforming reaction was effected under the following conditions:

Hydrogen:heavy naphtha (having the same composition as that of Example 4)=5:1 (volume ratio)
LHSV=2.0
Reaction pressure=10 kg./cm.$^2$
Reaction temperature=500° C.

The results of the reforming reaction until 50 hours are summarized below.

| Example number | Third active component, M | Salt | Amount of third active component, x | Yield of— Liquid | Yield of— Aromatics | Concentration of aromatics in fractions boiling at above 135° C. | Rate of lowering of catalitic activity,[1] α (×10⁻⁴) |
|---|---|---|---|---|---|---|---|
| 7 | Sn | SnCl₂·2H₂O | 0.3 | 82.0 | 70.3 | 100 | 3.3 |
| 8 | Zn | Zn(NO₃)₂·6H₂O | 0.17 | 87.0 | 73.9 | 99.0 | 5.0 |
| 9 | K | K₂CO₃ | 0.2 | 89.4 | 69.5 | 98.2 | 2.5 |
| 10 | Cu | Cu(NO₃)₂·3H₂O | 0.16 | 86.3 | 71.8 | 99.4 | 11.3 |
| 11 | Re | ReCl₃ | 0.48 | 79.5 | 67.1 | 100 | 7.7 |
| 12 | | | | 85.3 | 69.3 | 99.7 | 8.5 |

[1] $\alpha = \frac{1}{50} \log \frac{Y_0}{Y_{50}}$:

($Y_0$ = Yield of aromatics in the initial time of reaction).
($Y_{50}$ = Yield of aromatics in the time of 50 hours after the initiation of reaction).

COMPARATIVE EXAMPLE

The same procedure as in the above Example 1 was repeated except that the microcrystalline cellulose was omitted to produce a catalyst, which will be hereinafter referred to as carrier D.

The measurement of the pore diameters of the so obtained carrier by a mercury method showed the following distribution.

| Pore diameter (A.): | Volume (10⁻² ml./g.) |
|---|---|
| 1000 | 1.8 |
| 1500 | 2.4 |
| 2000 | 0.3 |
| 4000 | 0.2 |
| 6000 | 0.1 |

On the other hand, the same procedure as in the above Example 2 was repeated except that the cellulose was omitted to produce a catalyst, which will be hereinafter referred to as carrier E.

The measurement of the pore diameters of the so obtained carrier by a mercury method showed the following distribution.

| Pore diameter (A.): | Volume (10⁻² ml./g.) |
|---|---|
| 1000 | 1.1 |
| 1500 | 2.2 |
| 2000 | 0.8 |
| 6000 | 0.3 |

The same procedure as in the above Example 4 was repeated except that the carriers D and E prepared as above were utilized to produce two kinds of catalysts which will be hereinafter referred to as catalysts X and Y, respectively.

Then, the reforming reaction was effected in the same manner as in the above Example 4 by utilizing the catalysts X and Y, respectively.

The results of this reaction until 50 hours are shown below:

| Catalyst | X | Y |
|---|---|---|
| Yield of aromatics (percent) | 62.5 | 64.8 |
| Concentration of aromatics in fractions boiling at above 135° C | 91.3 | 97.3 |

What is claimed is:

1. A catalyst composition for the conversion of hydrocarbons which comprises an alumina carrier having pores of a pore diameter distribution with a peak in the range of 2,000–7,000 A. and an active agent containing platinum and lead supported on said alumina carrier wherein platinum and lead are present in amounts of 0.01–2% by weight and 0.01–3% by weight, respectively, based on the finished catalyst composition.

2. A catalyst composition as claimed in claim 1, wherein said active agent further contains from 0.01 to 3% by weight based on the weight of the finished catalyst of at least one more active component selected from the group consisting of copper, silver, gold, zinc, cadmium, mercury, yttrium, boron, thallium, titanium, zirconium, germanium, tin, vanadium, tantalum, phosphorus, antimony, bismuth, chromium, molybdenum, tungsten, manganese, rhenium, iron, cobalt, nickel, ruthenium, rhodium, palladium, osmium, iridium, thorium and uranium.

3. A process for the preparation of a catalyst composition which comprises incorporating into powdered alumina at least one organic substance selected from the group consisting of polysaccharides, starches, celluloses, polyvinyl alcohol, polyethylene glycol, polypropylene glycol and polyacrylamide, subjecting the resulting mixture to a molding, followed by firing to produce an alumina carrier having pores of a pore diameter distribution having a peak in the range of 2,000–7,000 A. and adding an active agent containing platinum and lead supported on the alumina carrier wherein said platinum and lead are present in amounts of 0.01–2% by weight and 0.01–3% by weight, respectively, based on the finished catalyst composition.

4. A process as claimed in claim 3, wherein said powdered alumina is selected from the group consisting of γ-alumina, θ-alumina, η-alumina, and alumina hydroxide and an alumina hydrate.

5. A process as claimed in claim 3, wherein said powdered alumina contains less than 20% by weight of silica.

6. A process as claimed in claim 3, wherein the firing to produce the alumina carrier is effected at 300–900° C.

7. A process as claimed in claim 3, wherein said organic substance is employed in an amount of 1–10% by weight based upon said powdered alumina.

8. A process as claimed in claim 3, wherein said molding is effected with the addition of water of an amount of 50–75% by weight based on the powdered alumina, employing a disc granulating method, an extrusion method or a tabletting method.

9. A process as claimed in claim 3, wherein said active agent further contains at least 0.01 to 3% by weight based on the finished catalyst of one more active component selected from the group consisting of copper, silver, gold, zinc, cadmium, mercury, yttrium, boron, thallium, titanium, zirconium, germanium, tin, vanadium, tantalum, phosphorus, antimony, bismuth, chromium, molybdenum, tunsten, manganese, rhenium, iron, cobalt, nickel, ruthenium, rhodium, palladium, osmium, iridium, thorium and uranium.

10. A process as claimed in claim 3, wherein the platinum and the lead are supported on the alumina by impregnation thereof.

11. A process as claimed in claim 3, wherein the platinum and lead are supported on the alumina by coprecipitation thereon.

12. A process as claimed in claim 3, wherein the lead is first supported on the alumina by coprecipitation thereon and subsequently, the platinum is supported on the alumina by impregnation thereon.

13. A process as claimed in claim 10, wherein the weight ratio of lead to platinum is 0.1–3.0:1 and the weight of the third active component is 0.01 to 3% by weight.

14. A process as claimed in claim 11, wherein the weight of the third active component is 0.01 to 3% by weight and the ratio of lead to platinum is 0.1–5.0:1.

15. A process as claimed in claim 12, wherein the weight of the third active component is 0.01 to 3% by weight and the weight ratio of lead to platinum is 0.2–5.0:1.

References Cited

UNITED STATES PATENTS

| | | | |
|---|---|---|---|
| 3,649,565 | 3/1972 | Wilhelm | 252—466 Pt |
| 2,409,494 | 10/1946 | Keating | 252—430 X |
| 2,697,066 | 12/1954 | Sieg | 252—463 X |
| 3,322,494 | 5/1967 | Magee et al. | 252—463 X |
| 2,930,762 | 3/1960 | Schoenenberger | 252—463 X |
| 2,950,243 | 8/1960 | Brennan et al. | 208—138 |

DANIEL E. WYMAN, Primary Examiner

W. J. SHINE, Assistant Examiner

U.S. Cl. X.R.

208—138; 252—455 R, 464, 465, 466 Pt, 466 B